Dec. 2, 1969    C. J. BARECKI ET AL    3,481,624

SAFETY VEHICLE

Filed Dec. 4, 1968

INVENTORS
Chester J. Barecki
Bror W. Henrikson
BY Dawson, Tilton, Fallon
and Lungmus
ATTORNEYS 3,481,624
SAFETY VEHICLE
Chester J. Barecki and Bror W. Henrikson, Grand Rapids, Mich., assignors to American Seating Company, Grand Rapids, Mich., a corporation of Delaware
Filed Dec. 4, 1968, Ser. No. 781,009
Int. Cl. B60p 7/00, 7/16
U.S. Cl. 280—150                                    2 Claims

ABSTRACT OF THE DISCLOSURE

A retainer plate supports an inertia reel within an upwardly extending embossment formed in a vehicle roof, and a safety belt or harness is attached to the inertia reel. The transversely extending embossment rigidifies the roof and gives the roof added strength, and should the car undergo sudden deceleration, the retainer plate deforms to absorb kinetic energy and prevent injury to the occupant.

BACKGROUND AND SUMMARY

In Patent No. 2,988,976 a safety harness is secured within the vehicle and extends about the occupant, the upper end of the safety harness being connected to an inertia reel which, in turn, is secured to rigid metal beams at the top of the car. The inertia reel or automatic reel is of the type shown in Patent No. 2,899,146.

We have discovered that instead of attaching the reel to rigid frame members, it is possible to secure the inertia reel to a retainer plate which is secured to the roof and supports the reel within an upwardly extending embossment provided in the roof. The embossment not only provides a compartment for concealing the reel, but it also rigidifies and strengthens the roof. As stress is applied to the top of the harness, the retainer plate deforms commensurate with the amount of energy that must be absorbed to gradually check the forward movement of the occupant. Injury to the occupant is thereby prevented very much the same as in the case of the gradual application of brakes in the stopping of an automobile.

DESCRIPTION OF THE DRAWINGS

The invention is explained in conjunction with an illustrative embodiment shown in the accompanying drawings, in which.

DETAILED DESCRIPTION

Figure 1:
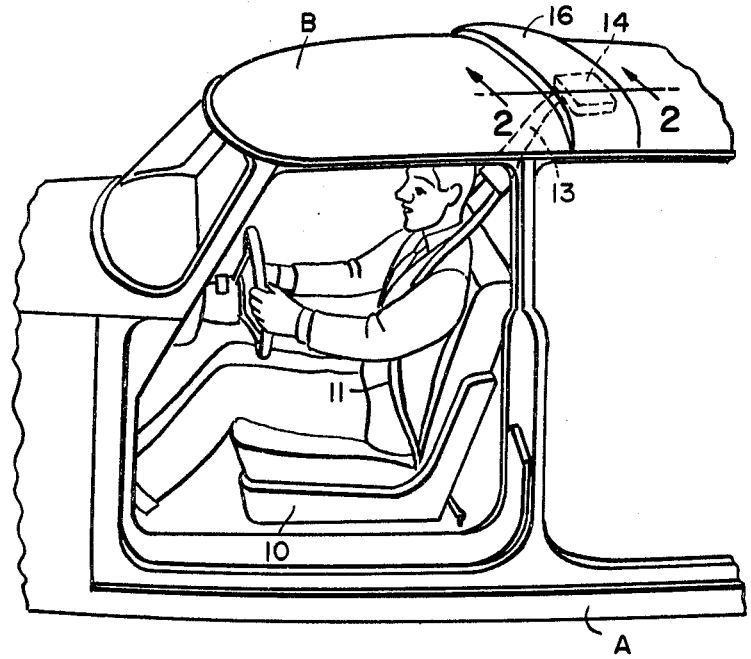
FIG. 1 is a broken side view in elevation of an automobile equipped with safety harness having the lower end secured to the floor portion of the vehicle and the upper end secured to the roof portion of the vehicle, the driver being in normal driving position.
Figure 2:
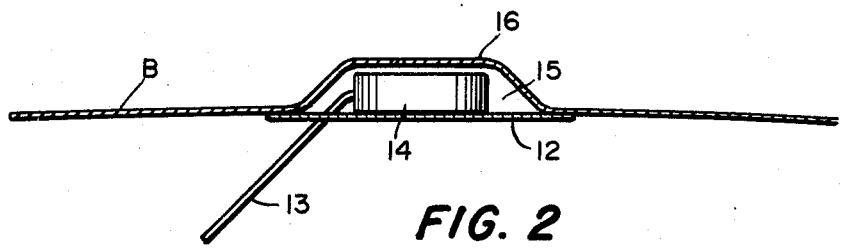
FIG. 2 is an enlarged fragmentary sectional view taken along the line 2—2 of FIG. 1.

In the illustration given in the drawings, A designates an automobile equipped with a roof B. In the automobile, a seat 10 is provided for the occupant and a harness 11 has its lower end secured to the lower portion of the car and its upper end secured to the roof of the car by means of a bearing plate or retainer plate 12. We prefer to secure the lower end of the harness to the floor of the car or to any suitable lower portion of the car frame. If desired, the harness may be of the type shown in Patent No. 2,898,976 or of any suitable type. We prefer to have the harness extend about one or both shoulders of the occupant and extend then upwardly, terminating in a cable or strap 13, which actuates the inertia device or reel 14. A suitable inertia device is shown in Patent No. 2,899,146. Since such inertia reels are well known in the art, a further description herein is believed unnecessary.

The inertia reel 14 is suitably secured to the retainer plate 12 as by bolts, and the reel is positioned within a compartment 15 provided by an upwardly extending embossment 16 formed in the vehicle roof. The elongated embossment 16 is somewhat channel-shaped in transverse cross section and extends transversely across the roof of the vehicle from one side of the vehicle to the other rearwardly of the seat 10. The embossment not only strengthens and rigidifies the roof of the vehicle, but it provides the compartment 15 for concealing the reel 14.

The retainer plate 12 extends below the embossed portion of the roof within the interior of the vehicle and is suitably anchored to the roof on both sides of the embossment by welding, bolts, or the like. A suitable opening is provided in the plate through which the strap 13 extends, and the plate is made of a gauge to provide controlled deformation commensurate with the energy to be absorbed to prevent injury to the occupant.

Figure 3:
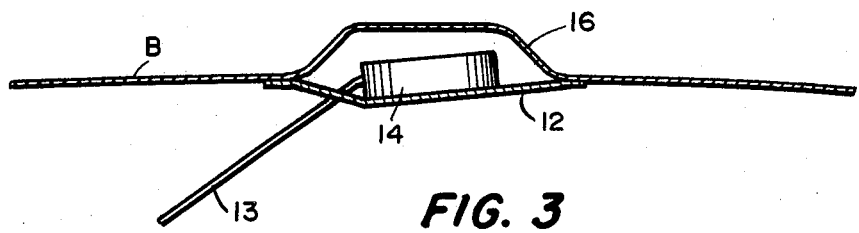
FIG. 3 is a view similar to FIG. 2 showing the retainer plate deforming under sudden deceleration of the vehicle.

FIG. 3 illustrates the deformation of the retainer plate 12 as the vehicle undergoes sudden deceleration and stress is applied to the strap 13. The roof does not deflect or deform, and the retainer plate 12 absorbs energy and gradually checks the forward motion of the occupant.

The retainer plate may extend from one side of the car to the other, and a second inertia reel may be attached to the plate for a second occupant.

While in the foregoing specification, we have set forth a detailed description of our invention for the purpose of illustration, it is to be understood that many of the details hereingiven may be varied considerably by those skilled in the art without departing from the spirit and scope of our invention.

We claim:
1. In combination with a vehicle having a roof and a seat for an occupant, said roof having an upwardly extending embossment formed therein, a retainer plate extending across said embossment and secured to the roof, said retainer plate being of a gauge to provide controlled deformation commensurate with the energy to be absorbed, an inertia reel supported by said plate within said embossment, a safety harness for the occupant having one end secured to the lower portion of the vehicle and an upper end secured to the reel whereby upon accidental sudden deceleration of the vehicle causing the body of the occupant to be thrown forward, said harness directs the force of movement of said occupant against said reel and thereby against the retainer plate to deform the plate to absorb the energy of the deceleration.

2. The structure of claim 1 in which said embossment extends transversely across the roof between the sides of the vehicle and rearwardly of said seat.

References Cited

UNITED STATES PATENTS 3,371,960   3/1968   Bayer _____ 280—150

LEO FRIAGLIA, Primary Examiner

R. R. SONG, Assistant Examiner